United States Patent
Chang et al.

(10) Patent No.: US 7,529,740 B2
(45) Date of Patent: May 5, 2009

(54) METHOD AND APPARATUS FOR ORGANIZING DATA SOURCES

(75) Inventors: Yuan-chi Chang, Bayside, NY (US); Lipyeow Lim, North White Plains, NY (US); Min Wang, Cortlandt Manor, NY (US); Zhen Zhang, Champaign, IL (US)

(73) Assignee: International Business Machines Corporation, Armonk, NY (US)

( * ) Notice: Subject to any disclaimer, the term of this patent is extended or adjusted under 35 U.S.C. 154(b) by 167 days.

(21) Appl. No.: 11/503,713

(22) Filed: Aug. 14, 2006

(65) Prior Publication Data

US 2008/0040326 A1    Feb. 14, 2008

(51) Int. Cl.
G06F 17/30 (2006.01)
(52) U.S. Cl. .......................... 707/3; 707/200; 707/204; 707/205
(58) Field of Classification Search .......... 707/3, 707/200, 204, 205
See application file for complete search history.

(56) References Cited

U.S. PATENT DOCUMENTS

| | | | | |
|---|---|---|---|---|
| 6,012,052 | A * | 1/2000 | Altschuler et al. | 707/2 |
| 6,820,075 | B2 * | 11/2004 | Shanahan et al. | 707/3 |
| 7,035,877 | B2 * | 4/2006 | Markham et al. | 707/200 |
| 2005/0210008 | A1 * | 9/2005 | Tran et al. | 707/3 |
| 2005/0210009 | A1 * | 9/2005 | Tran | 707/3 |
| 2005/0273475 | A1 * | 12/2005 | Herzenberg et al. | 707/200 |
| 2006/0089947 | A1 * | 4/2006 | Gallivan et al. | 707/102 |
| 2007/0061319 | A1 * | 3/2007 | Bergholz | 707/5 |
| 2007/0168856 | A1 * | 7/2007 | Berkner et al. | 715/517 |
| 2007/0174267 | A1 * | 7/2007 | Patterson et al. | 707/5 |
| 2007/0208719 | A1 * | 9/2007 | Tran | 707/3 |

OTHER PUBLICATIONS

Y. Huang, H. Xiong, W. Wu, and Z.Zhang. A Hybrid Approach for Mining Maximal Hyperclique Patterns, in Proc. of the 16th IEEE Int'l Conf. on Tools with Artificial Intelligence (ICTAI), 2004, pp. 354-361.
A.K. Jain, M.N. Murty and P.J. Flynn. Data Clustering: a review. ACM Comput. Surv., 31(3):264-323, 1999.

* cited by examiner

Primary Examiner—Don Wong
Assistant Examiner—Kim T Nguyen
(74) Attorney, Agent, or Firm—Scully, Scott, Murphy & Presser, P.C.; Lisa M. Yamonaco

(57) ABSTRACT

A method for organizing deep Web services is provided. In one aspect, the method obtains a collection of sources and their associated attributes and/or input modes, for instance, using a crawling algorithm. The method uses this information to organize the sources into communities. A mining algorithm such as the hyperclique mining algorithm is used to obtain cliques of highly correlated attributes. A clustering algorithm such as the hierarchical agglomerative clustering algorithm is used to further cluster the cliques of attributes into larger cliques, which in the present disclosure is referred to as signatures. The sources that are associated with each signature form a community and a graph representation of the communities is constructed, where the vertices are communities and the edges are the shared attributes.

1 Claim, 1 Drawing Sheet

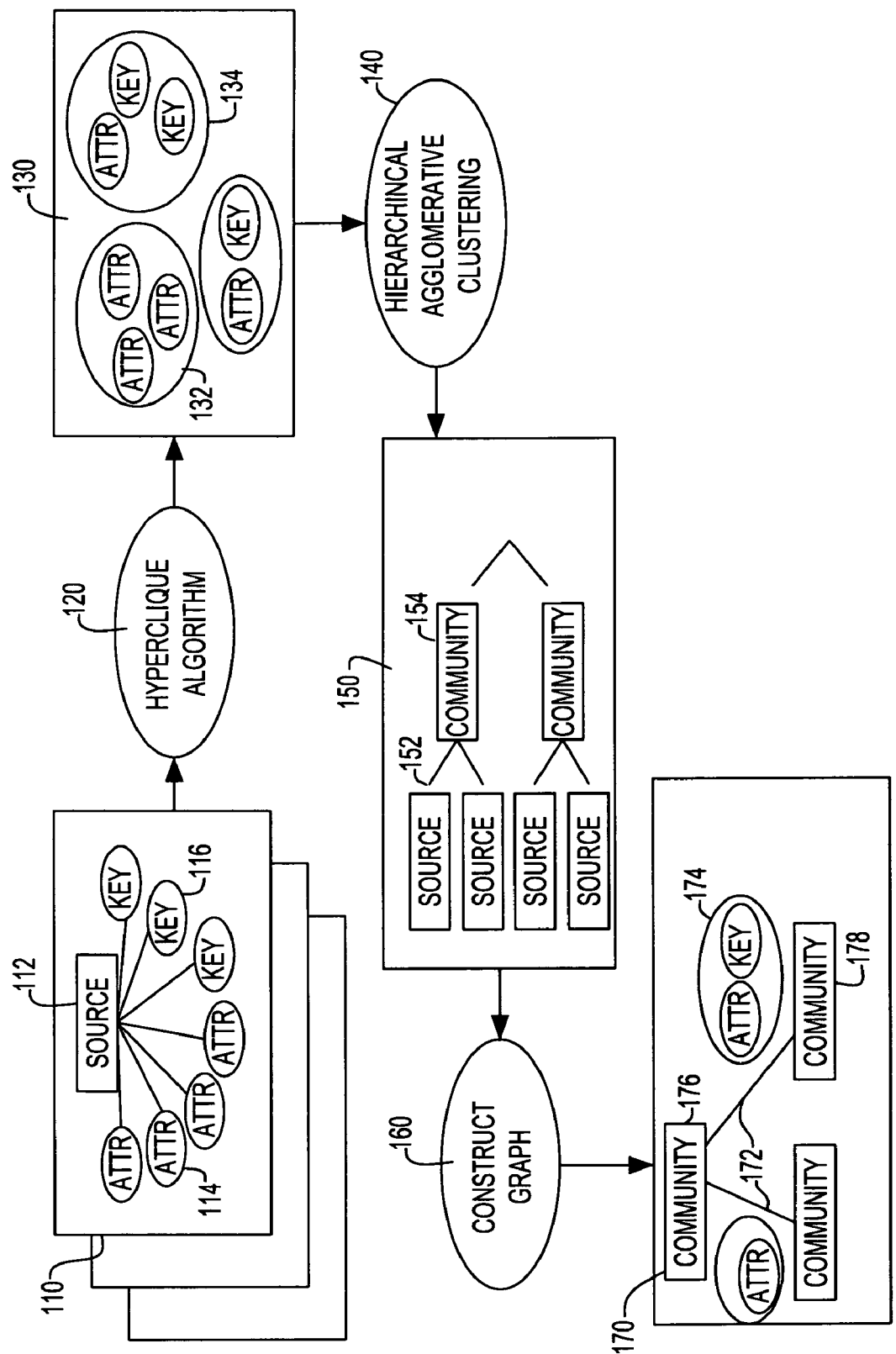

METHOD AND APPARATUS FOR ORGANIZING DATA SOURCES

FIELD OF THE INVENTION

The present disclosure relates to data processing, more specifically, to a method for collecting and organizing the metadata about on-line or World Wide Web (Web) databases, which for example can support search, navigation and exploration of these Web databases.

BACKGROUND OF THE INVENTION

As the Internet becomes increasingly driven by Web services and on-line databases, the simple keyword search interfaces provided by most Web search engines are no longer adequate for searching, navigating an exploring web services and on-line databases. When navigating or searching for Web services, a user is often more interested in Web services from a particular domain, or Web services containing a particular set of input attributes, or Web services that are similar to a given example of a Web service. For example, a user may want to find all on-line bookstore databases, or all on-line databases with an input for ISBN and price, or all on-line databases similar to "amazon.com." Current search engine technology does not support such queries.

BRIEF SUMMARY OF THE INVENTION

A method for organizing data sources are provided. In one aspect, the method organizes Web services and allows access to deep Web databases. The method in one aspect stores, models and analyzes the deep Web services to obtain knowledge that can be used to navigate, explore and query web services.

The method of organizing data sources, in one aspect, includes grouping a plurality of items including input attributes, output attributes, or keywords or combination thereof from one or more sources into a plurality of cliques of highly correlated items. The method also includes clustering the plurality of cliques into one or more signatures. For each of the one or more signatures, the method includes selecting one or more sources that are associated with a signature and forming the selected sources into a community.

The method in one aspect may also include constructing a graph representation of a plurality of communities. The graph representation includes at least a plurality of vertices representing the plurality of communities respectively and one or more edges connecting the plurality of vertices. The one or more edges represent one or more input attributes, output attributes, or keywords or combination thereof that are shared between the communities represented in the connecting vertices.

The step of grouping may be performed using a hyperclique mining algorithm. The step of clustering may be performed using a hierarchical agglomerative clustering algorithm. The method may further include obtaining the plurality of items including input attributes, output attributes, or keywords or combination thereof from one or more sources using a crawling algorithm.

Further features as well as the structure and operation of various embodiments are described in detail below with reference to the accompanying drawings. In the drawings, like reference numbers indicate identical or functionally similar elements.

BRIEF DESCRIPTION OF THE DRAWINGS

FIG. 1 is a block diagram illustrating the data flow in one embodiment of the present disclosure.

DETAILED DESCRIPTION

The present application discloses a method and apparatus for organizing deep Web services that provide access to online databases. The method and apparatus in one embodiment store interface information of deep Web services and perform analysis on the interface information in order to organize the information to support non-trivial queries. In one embodiment of the present disclosure, interface information of Web services is obtained by crawling the Web. Any other known or will-be-known method may be used to gather the interface information of Web services.

An exemplary embodiment of the present disclosure models on-line databases using three entities: a source is the database itself; an attribute is one of the input attributes of the query interface for a source; a community is a collection of sources that logically belong together. A community can contain many sources. A source can be associated with many attributes. An attribute can be associated with several input modes. For example, an attribute can be a text box or combo box on the query interface.

A crawling technology may be used to obtain a collection of sources and their associated attributes and input modes. The method and apparatus in an exemplary embodiment use this information to organize the sources into communities. In an exemplary embodiment, a mining algorithm such as the hyperclique mining algorithm is used to obtain cliques of highly correlated attributes. A clustering algorithm such as the hierarchical agglomerative clustering algorithm is used to further cluster the cliques of attributes into larger cliques, which in the present disclosure is referred to as signatures. The sources that are associated with each signature form a community and a graph representation of the communities is constructed, where the vertices are communities and the edges are the shared attributes.

FIG. 1 is a block diagram illustrating the data flow of the present disclosure in one embodiment. The collection 110 of data sources 112 together with their associated attributes 114 and keywords 116 are obtained for example using a crawling algorithm or any other information gathering method. Attributes for example are input and output attributes appearing on a Web query forms. Examples of attributes include but are not limited to departure data, departure city, airline flights, prices, etc., which for instance may appear on an airline query form. Keywords 116 are, for example, texts appearing on a Web query form or interface.

In an exemplary embodiment, a mining algorithm such as the hyperclique mining algorithm 120 is used to obtain a collection 130 of cliques of highly correlated attributes 132 and/or keywords 134 from the sources 110. The hyperclique mining algorithm is described in detail in Y. Huang, H. Xiong, W. Wu, and Z. Zhang, A hybrid Approach for Mining Maximal Hyperclique Patterns. A hyperclique pattern refers to a type of association pattern that contains items that are highly affiliated with each other. The presence of an item in one transaction strongly implies the presence of every other item that belongs to the same clique.

A clustering algorithm such as the hierarchical agglomerative clustering algorithm 140 is used to further cluster the cliques of attributes into larger cliques, which in the present disclosure is referred to as signatures. The hierarchical agglomerative clustering algorithm is described in detail in A. K. Jain, M. N. Murty, and P. J. Flynn. Data clustering: a review. *ACM Comput. Surv.,* 31(3):264323, 1999. A hierarchy 150 of sources and communities is generated, for instance, using the clustering algorithm. The sources 152 that are associated with each signature form a community 154.

A graph construction method or tool is used at 160 to provide a graph representation of communities 170 where the edges represent one or more sets of shared attributes between the communities. For instance, community 176 and community 178 share the attributes 174. In one embodiment, the graph can be navigated by starting at a vertex (community) and following the outgoing edges to related communities. For instance, starting at a source, all associated vertices (communities) can be found and navigated by following the edges to related communities. In addition, navigation may start from an attribute or keyword, finding all associated edges and traversing to incident vertices.

Unlike the known search engine techniques, the method and apparatus of the present disclosure in an exemplary embodiment provide searching capabilities, not only in Web pages and their content, but also in Web services and their interfaces. The method and apparatus of the present disclosure in an exemplary embodiment allow for beyond keyword-based and hyperlink-based processing by exploiting the co-occurrence information of the input attributes of deep Web services to "mine" out the non-trivial knowledge for answering queries. The method and apparatus of the present disclosure in an exemplary embodiment provide a common infrastructure to organize data sources by grouping similar data sources together and discovering relationships between data sources or groups, for example, shared attributes.

The system and method of the present disclosure may be implemented and run on a general-purpose computer or computer system. The computer system may be any type of known or will be known systems and may typically include a processor, memory device, a storage device, input/output devices, internal buses, and/or a communications interface for communicating with other computer systems in conjunction with communication hardware and software, etc.

The terms "computer system" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and server.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A computer-implemented method of organizing data sources, comprising:

grouping, using a hyperclique mining algorithm, a plurality of items including at least input attributes, output attributes, and keywords from one or more sources into a plurality of cliques of highly correlated items, the input attributes and output attributes being query attributes appearing on web query forms, the web query forms being associated with deep web services;

clustering, using a hierarchical agglomerative clustering algorithm, the plurality of cliques into one or more signatures;

for each of the one or more signatures, selecting one or more sources including one or more input attributes or output attributes or combinations thereof that are associated with a signature; and forming the selected sources into a community, the community being a collection of sources that logically belong together;

constructing a graph representation of a plurality of communities, the graph representation including at least a plurality of vertices representing the plurality of communities respectively and one or more edges connecting the plurality of vertices, the one or more edges representing at least one or more input attributes or output attributes or combination thereof that are shared between the communities represented in the connecting vertices; and navigating the graph representation including at least one of:

starting at a vertex representing a community, following one or more edges to one or more second vertices representing one or more related communities starting at a source, traversing to one or more associated vertices; and starting from an attribute or a keyword or combination thereof, traversing one or more associated edges and connected vertices, wherein data associated with deep web services may be stored, modeled, and analyzed to obtain knowledge to navigate, explore and query web services.

* * * * *